(12) United States Patent
Spangler

(10) Patent No.: US 10,753,216 B2
(45) Date of Patent: Aug. 25, 2020

(54) SLIDING BAFFLE INSERTS

(71) Applicant: United Technologies Corporation, Farmington, CT (US)

(72) Inventor: Brandon W. Spangler, Vernon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/105,607

(22) Filed: Aug. 20, 2018

(65) Prior Publication Data

US 2018/0371926 A1    Dec. 27, 2018

Related U.S. Application Data

(62) Division of application No. 14/880,620, filed on Oct. 12, 2015, now Pat. No. 10,053,996.

(Continued)

(51) Int. Cl.
*F01D 5/18* (2006.01)
*F01D 9/04* (2006.01)
(Continued)

(52) U.S. Cl.
CPC ............ *F01D 9/041* (2013.01); *F01D 5/188* (2013.01); *F01D 9/02* (2013.01); *F01D 25/12* (2013.01); *F05D 2220/32* (2013.01); *F05D 2230/232* (2013.01); *F05D 2230/60* (2013.01); *F05D 2240/12* (2013.01); *F05D 2240/126* (2013.01);
(Continued)

(58) Field of Classification Search
CPC . F01D 9/02; F01D 5/188; F01D 5/189; F01D 9/041; F01D 9/065; F01D 25/12; F05D 2220/32; F05D 2230/232; F05D 2230/60; F05D 2240/12; F05D 2240/126; F05D 2260/201; F05D 2260/202
See application file for complete search history.

(56) References Cited

U.S. PATENT DOCUMENTS 3,767,322 A * 10/1973 Durgin .................... F01D 5/189
416/97 R
3,806,276 A *  4/1974 Aspinwall ............... F01D 5/189
416/97 R
(Continued)

FOREIGN PATENT DOCUMENTS

GB            1467483 A      3/1977
WO       2013041361 A1      3/2013

OTHER PUBLICATIONS

European Search Report for Application No. 15189444.1-1610; dated Apr. 21, 2016; 9 pgs.

*Primary Examiner* — David E Sosnowski
*Assistant Examiner* — Theodore C Ribadeneyra
(74) *Attorney, Agent, or Firm* — Cantor Colburn LLP

(57) ABSTRACT

A vane includes a vane body extending from a root to an opposed tip along a longitudinal axis and first and second baffle bodies. The vane body defines a leading edge and a trailing edge, and a cavity defined between the leading edge, the trailing edge, the root and the tip. The vane body includes at least one vane rib defined between the leading edge and the trailing edge inside the cavity. The first baffle body is defined in one of a leading edge portion and a trailing edge portion of the cavity. The second baffle body is defined in a middle portion of the cavity.

14 Claims, 5 Drawing Sheets

Related U.S. Application Data

(60) Provisional application No. 62/091,293, filed on Dec. 12, 2014.

(51) Int. Cl.
 *F01D 25/12* (2006.01)
 *F01D 9/02* (2006.01)

(52) U.S. Cl.
 CPC .. *F05D 2260/201* (2013.01); *F05D 2260/202* (2013.01); *Y02T 50/676* (2013.01)

(56) References Cited

U.S. PATENT DOCUMENTS

| | | | | |
|---|---|---|---|---|
| 3,902,820 A * | 9/1975 | Amos | F01D 5/189 | 416/97 R |
| 4,025,226 A * | 5/1977 | Hovan | F01D 5/186 | 415/115 |
| 4,056,332 A * | 11/1977 | Meloni | F01D 5/188 | 416/97 A |
| 4,063,851 A * | 12/1977 | Weldon | F01D 5/186 | 416/97 A |
| 4,153,386 A * | 5/1979 | Leogrande | F01D 5/188 | 415/115 |
| 4,168,938 A * | 9/1979 | Dodd | F01D 5/188 | 415/115 |
| 4,252,501 A * | 2/1981 | Peill | F01D 5/189 | 415/115 |
| 4,297,077 A * | 10/1981 | Durgin | F01D 5/189 | 416/97 R |
| 4,437,810 A * | 3/1984 | Pearce | F01D 5/189 | 415/115 |
| 4,461,612 A * | 7/1984 | Dodd | F01D 5/186 | 415/115 |
| 4,790,721 A * | 12/1988 | Morris | F01D 5/187 | 416/241 B |
| 5,193,975 A * | 3/1993 | Bird | F01D 5/186 | 415/115 |
| 5,207,556 A * | 5/1993 | Frederick | F01D 5/189 | 415/115 |
| 5,259,730 A * | 11/1993 | Damlis | B23P 15/04 | 416/96 A |
| 5,511,937 A * | 4/1996 | Papageorgiou | F01D 5/189 | 415/115 |
| 5,516,260 A * | 5/1996 | Damlis | F01D 5/189 | 415/115 |
| 5,533,864 A * | 7/1996 | Nomoto | F01D 5/186 | 415/115 |
| 5,591,002 A * | 1/1997 | Cunha | F01D 5/187 | 415/115 |
| 5,704,763 A * | 1/1998 | Lee | F01D 5/188 | 415/115 |
| 6,183,192 B1 * | 2/2001 | Tressler | F01D 5/189 | 415/115 |
| 6,238,182 B1 * | 5/2001 | Mayer | F01D 5/189 | 415/115 |
| 6,283,708 B1 * | 9/2001 | Zelesky | F01D 5/189 | 416/97 R |
| 6,398,486 B1 * | 6/2002 | Storey | F01D 5/188 | 415/114 |
| 6,428,273 B1 * | 8/2002 | Keith | F01D 5/189 | 416/97 R |
| 6,450,759 B1 * | 9/2002 | Miller | F01D 5/187 | 415/115 |
| 6,709,230 B2 * | 3/2004 | Morrison | F01D 5/189 | 415/115 |
| 6,742,984 B1 * | 6/2004 | Itzel | F01D 5/189 | 29/889.722 |
| 7,080,971 B2 * | 7/2006 | Wilson | F01D 5/147 | 416/92 |
| 7,118,326 B2 * | 10/2006 | Liang | F01D 5/189 | 415/115 |
| 7,255,535 B2 * | 8/2007 | Albrecht | F01D 5/147 | 416/229 R |
| 7,435,058 B2 * | 10/2008 | Campbell | F01D 5/14 | 416/232 |
| 7,497,655 B1 * | 3/2009 | Liang | F01D 5/189 | 415/1 |
| 7,824,150 B1 * | 11/2010 | Kimmel | F01D 5/147 | 415/115 |
| 7,828,515 B1 * | 11/2010 | Kimmel | F01D 5/189 | 415/115 |
| 7,918,647 B1 * | 4/2011 | Liang | F01D 5/188 | 416/96 A |
| 8,052,391 B1 * | 11/2011 | Brown | F01D 5/147 | 416/223 A |
| 8,162,617 B1 * | 4/2012 | Davies | F01D 5/147 | 416/223 R |
| 8,167,537 B1 | 5/2012 | Plank et al. | | |
| 8,241,001 B2 * | 8/2012 | James | F01D 5/147 | 416/224 |
| 8,322,988 B1 * | 12/2012 | Downs | F01D 5/147 | 416/96 R |
| 8,366,391 B2 * | 2/2013 | Tsukagoshi | F01D 5/16 | 416/233 |
| 8,556,578 B1 * | 10/2013 | Memmen | F01D 5/189 | 277/644 |
| 8,608,430 B1 * | 12/2013 | Liang | F01D 5/187 | 415/115 |
| 8,777,569 B1 * | 7/2014 | Liang | F01D 5/188 | 416/96 A |
| 8,864,438 B1 * | 10/2014 | Lee | F01D 5/188 | 415/1 |
| 8,956,105 B2 * | 2/2015 | Uskert | F01D 5/10 | 415/115 |
| 9,011,077 B2 * | 4/2015 | Vitt | F01D 5/186 | 415/115 |
| 2005/0089394 A1 * | 4/2005 | Lu | F01D 5/186 | 415/115 |
| 2006/0133923 A1 * | 6/2006 | Paauwe | F01D 5/189 | 415/115 |
| 2010/0054915 A1 * | 3/2010 | Devore | F01D 5/189 | 415/116 |
| 2010/0129196 A1 * | 5/2010 | Johnston | F01D 5/188 | 415/115 |
| 2011/0110772 A1 * | 5/2011 | Arrell | B23P 15/04 | 415/177 |
| 2011/0123351 A1 * | 5/2011 | Hada | F01D 5/189 | 416/97 R |
| 2012/0219402 A1 * | 8/2012 | Harding | F01D 5/189 | 415/115 |
| 2014/0075947 A1 * | 3/2014 | Gautschi | F01D 5/189 | 60/726 |
| 2014/0093392 A1 * | 4/2014 | Tibbott | F01D 5/189 | 416/97 R |
| 2014/0219788 A1 | 8/2014 | Nilsson | | |
| 2014/0234088 A1 * | 8/2014 | Brandl | F01D 5/081 | 415/177 |
| 2015/0377038 A1 * | 12/2015 | Alpan | B22C 7/02 | 415/200 |
| 2016/0201487 A1 | 7/2016 | Spangler | | |
| 2017/0058679 A1 * | 3/2017 | Spangler | F01D 9/041 | |

\* cited by examiner

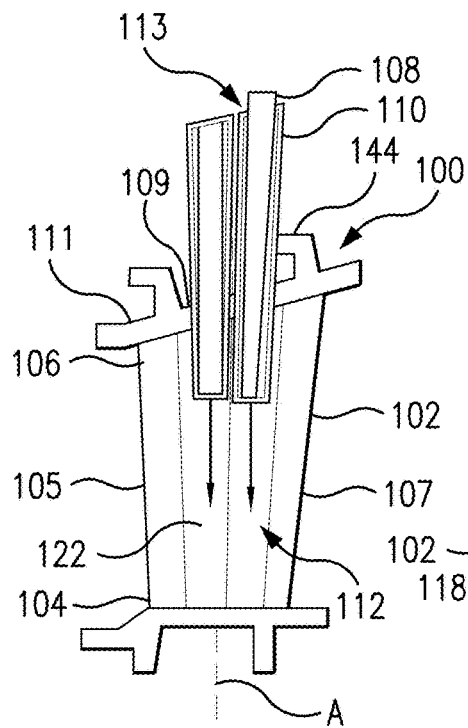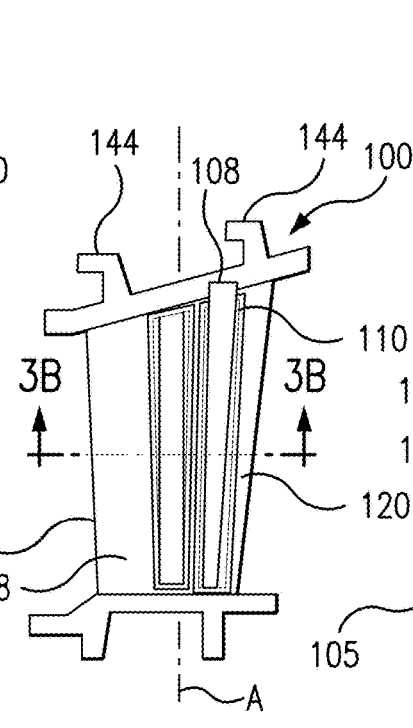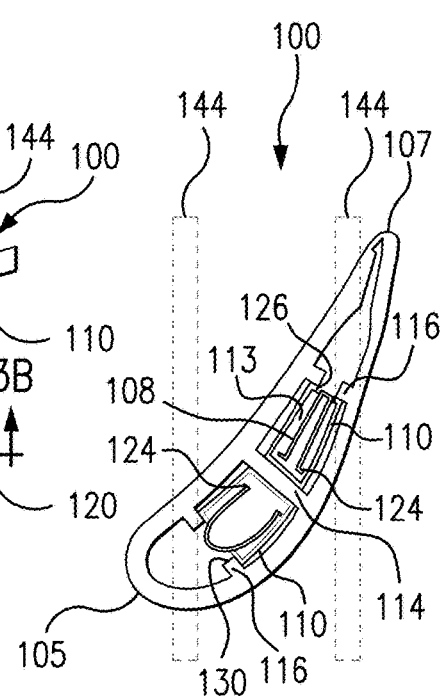
FIG. 2  FIG. 3A  FIG. 3B
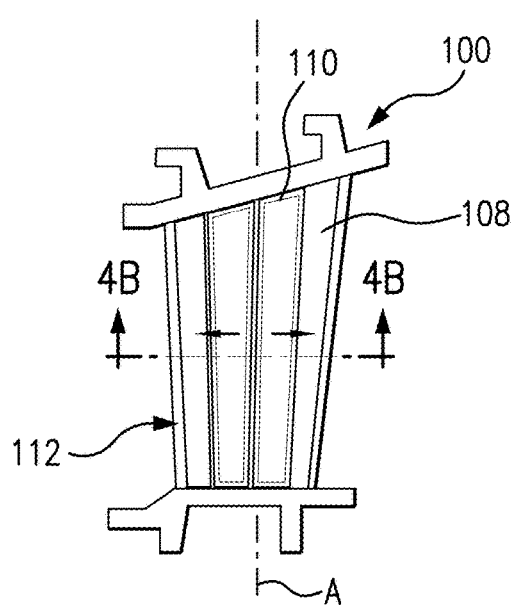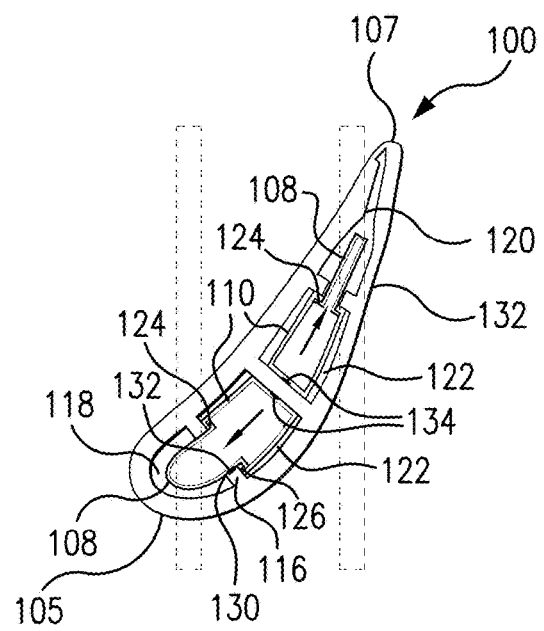
FIG. 4A  FIG. 4B

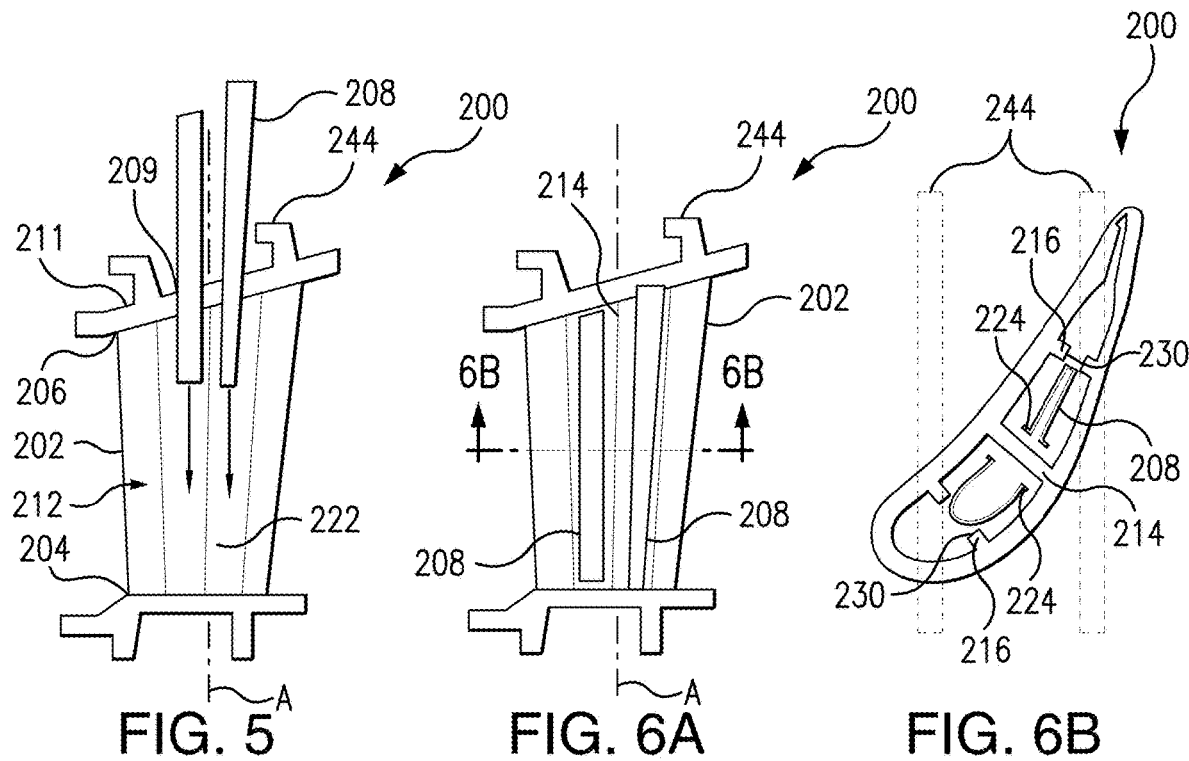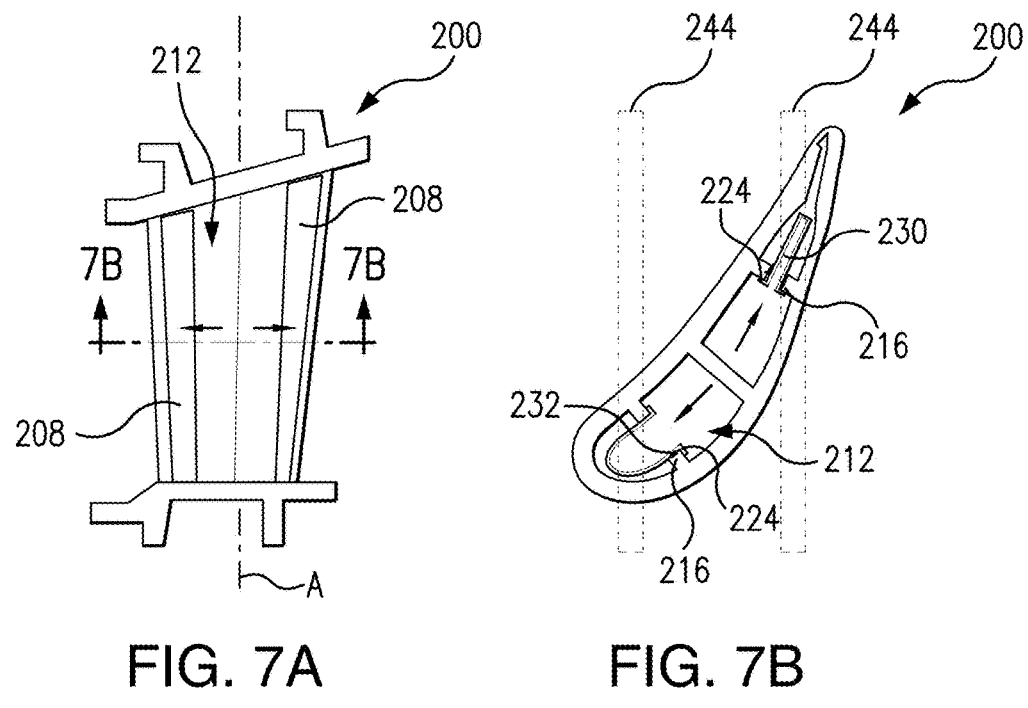

SLIDING BAFFLE INSERTS

CROSS REFERENCE TO RELATED APPLICATIONS

The present application is a divisional of U.S. Patent Application 14/880,620 filed Oct. 12, 2015, and claims the benefit of an earlier filing date from U.S. Provisional Application 62/091,293 filed Dec. 12, 2014, both of which are hereby incorporated in their entirety herein.

STATEMENT REGARDING FEDERALLY SPONSORED RESEARCH OR DEVELOPMENT

This invention was made with government support under contract number FA8650-09-D-2923-0021 awarded by the United States Air Force. The government has certain rights in the invention.

BACKGROUND OF THE INVENTION

1. Field of the Invention

The present disclosure relates to vanes, and more particularly to vane assemblies for gas turbine engines, for example.

2. Description of Related Art

Traditionally, turbomachines, as in gas turbine engines, include multiple stages of rotor blades and vanes to condition and guide fluid flow through the compressor and/or turbine sections. Due to the high temperatures in the turbine section, turbine vanes are often cooled with cooling air ducted into an internal cavity of the vane through a vane platform. In order to reduce the amount of cooling air required to cool turbine vanes, space filling baffles can be provided in the vane cavity to reduce the cavity volume, thereby increasing Mach numbers and heat transfer coefficients for the cooling flow. Unfortunately, in certain vane designs, attachment hooks and rails cover up the cavity opening preventing baffles from being inserted radially into that cavity.

Such conventional methods and systems have generally been considered satisfactory for their intended purpose. However, there is still a need in the art for improved blades and vanes. The present disclosure provides a solution for these problems.

SUMMARY OF THE INVENTION

A baffle insert for an airfoil includes a first baffle body extending from a first end to a second end along a longitudinal axis. The first baffle body includes a pair of opposing flanges.

The baffle insert can include a second baffle body having a hollow interior for receiving the first baffle body. The hollow interior can include a longitudinally extending opening facing a lateral direction for sliding the first baffle body between a nested position and an expanded position relative to the second baffle body. The flanges of the first baffle body can anchor the first baffle body to the second baffle body in the expanded position. The first and second baffle bodies can include a plurality of impingement holes for supplying cooling air to a cavity of an airfoil.

In accordance with certain embodiments, a vane includes a vane body extending from a root to an opposed tip along a longitudinal axis and first and second baffle bodies. The vane body defines a leading edge and a trailing edge, and a cavity defined between the leading edge, the trailing edge, the root and the tip. The vane body includes at least one vane rib defined between the leading edge and the trailing edge inside the cavity. The first baffle body is defined in one of a leading edge portion and a trailing edge portion of the cavity. The second baffle body is defined in a middle portion of the cavity.

The vane rib can be a slotted vane rib having a longitudinal slot. A portion of the first baffle body can be defined between the longitudinal slot of the slotted vane rib. The flanges of the first baffle body can anchor the first baffle body within the longitudinal slot of the slotted vane rib. The vane can also include a weld joint between the first baffle body and the slotted vane rib. The vane body can include a plurality of filmholes for supplying cooling air to outside of the vane body.

A vane as described above can be manufactured by a method including inserting a first baffle body into a vane opening defined in a vane body, sliding the first baffle body in one of a forward direction and an aft direction through a slotted rib of the vane body, and joining the first baffle body to the slotted rib of the vane body.

The method can also include inserting a second baffle body into the vane opening and joining the second baffle body to another rib of the vane body. Inserting the first baffle body into the vane opening can include inserting the first baffle body into the vane opening while the first baffle body is nested within a second baffle body. Sliding the first baffle body in one of a forward direction and aft direction can include sliding the first baffle body through a longitudinally extending opening of the second baffle body from a nested position into an expanded position. The method can also include joining the second baffle body to a non-slotted rib of the vane body.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 2 is a schematic cross-sectional side elevation view of an exemplary embodiment of a vane having sliding baffle inserts constructed in accordance with the present disclosure, showing the insertion of the nested baffle bodies;

FIG. 3A is a schematic cross-sectional side elevation view of the vane of FIG. 2, showing the nested baffle bodies inserted in the vane;

FIG. 3B is a schematic cross-sectional top plan view of the vane of FIG. 2, showing the nested baffle bodies inserted in the vane;

FIG. 4A is a schematic cross-sectional side elevation view of the vane of FIG. 2, showing the first baffles bodies being slid into the leading and trailing edge portions of the cavity;

FIG. 4B is a schematic cross-sectional top plan view of the vane of FIG. 2, showing the first baffle bodies being slid into the leading and trailing edge portions of the cavity and the flanges of the first baffle bodies anchored respective openings of the second baffle bodies;

FIG. 5 is a schematic cross-sectional side elevation view of another exemplary embodiment of a vane having sliding baffle inserts constructed in accordance with the present disclosure, showing the insertion of the first baffle bodies;

FIG. 6A is a schematic cross-sectional side elevation view of the vane of FIG. 5, showing the first baffle bodies inserted in the vane;

FIG. 6B is a schematic cross-sectional top plan view of the vane of FIG. 5, showing the first baffle bodies inserted in the vane;

FIG. 7A is a schematic cross-sectional side elevation view of the vane of FIG. 5, showing the first baffle bodies being slid into the leading and trailing edge portions of the cavity;

FIG. 7B is a schematic cross-sectional top plan view of the vane of FIG. 5, showing the first baffle bodies being slid into the leading and trailing edge portions of the cavity and the flanges of the first baffle bodies anchored to respective slotted vane ribs;

DETAILED DESCRIPTION OF THE PREFERRED EMBODIMENTS

Figure 1:
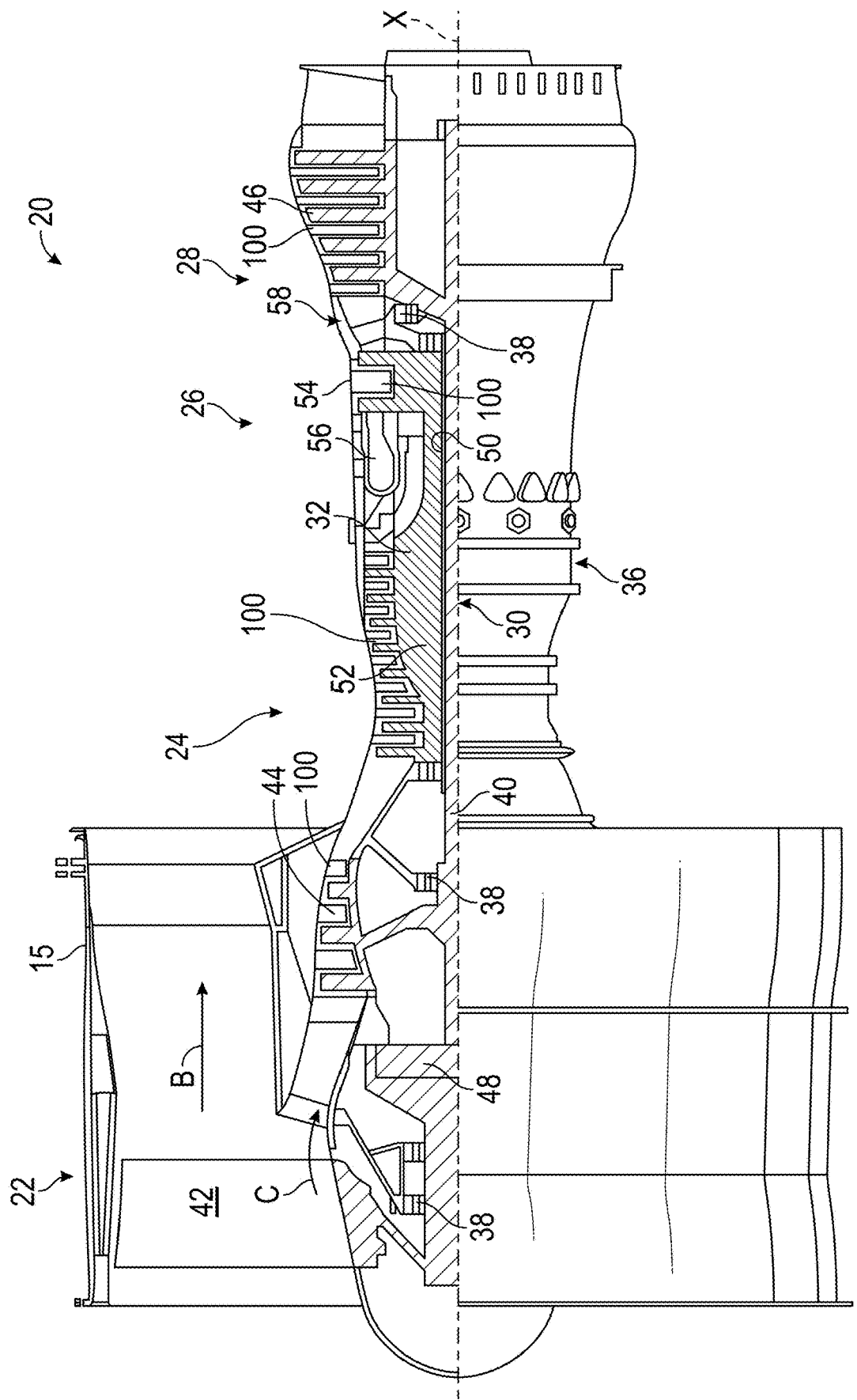
FIG. 1 is a schematic cross-sectional side elevation view of an exemplary embodiment of a gas turbine engine constructed in accordance with the present disclosure, showing locations of vanes.

Reference will now be made to the drawings wherein like reference numerals identify similar structural features or aspects of the subject disclosure. For purposes of explanation and illustration, and not limitation, a cross-sectional side elevation view of an exemplary embodiment of a gas turbine engine accordance with the disclosure is shown in FIG. 1 and is designated generally by reference character 20. Other embodiments of gas turbine engines in accordance with the disclosure, or aspects thereof, are provided in FIGS. 2-11B, as will be described.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a fan case 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

With continued reference to FIG. 1, the exemplary engine 20 generally includes a low speed spool 30 and a high speed spool 32 mounted for rotation about an engine central axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

Now with reference to FIGS. 1 and 2, combustor section 26 and turbine section 28 both include vanes 100. Each vane 100 includes a vane body 102 extending from a root 104 to an opposed tip 106 along a longitudinal axis A. Vane body 100 defines a leading edge 105 and a trailing edge 107. A cavity 112 is defined between leading edge 105, trailing edge 107, root 104 and tip 106. As best seen in FIG. 2, first baffle bodies 108 are nested within hollow interiors 113 of respective second baffle bodies 110. Nested first and second baffle bodies, 108 and 110, respectively, are inserted into a vane opening 109 proximate to vane tip 106, e.g. on the outer diameter platform 111. Nested first and second baffle bodies, 108 and 110, respectively, are inserted into a middle portion 122 of cavity 112. While first and second baffle bodies, 108 and 110, respectively, are described as being inserted into vane bodies, e.g. vane body 102, those having skill in the art will readily appreciate that first and second baffle bodies can also be used in other airfoils, e.g. blades, blade outer air seals, combustor panels, or the like.

Now with reference to FIGS. 3A-3B, generally, it tends to be difficult to insert anything in the longitudinal direction, e.g. along longitudinal axis A, into leading and trailing edge portions 118 and 120, respectively, of cavity 112 due to rails 144, the outlines of which are shown schematically in FIGS. 3A and 3B. Sliding baffle inserts, for example, first baffle bodies 108, are configured to slide laterally from middle portion 122 into leading and trailing edge portions 118 and 120, respectively, as will be described below. This lateral sliding configuration avoids the difficulty of longitudinal insertion that rails 144 present. As best seen in FIG. 3B, hollow interiors 113 of second baffle bodies 110 include an opening 126, e.g. a longitudinally extending opening, facing a lateral direction for sliding first baffle bodies 108 between a nested position and an expanded position. Vane body 102 includes a vane rib 114 and two slotted vane ribs 116 defined between leading edge 105 and trailing edge 107 inside cavity 112. Slotted vane ribs 116 each include a longitudinal slot 130. First baffle bodies 108 each include a pair of opposing flanges 124 configured to anchor each baffle body 108 into a respective opening 126 of the second baffle bodies 110.

As shown in FIGS. 4A and 4B, once the nested first and second baffle bodies, 108 and 110, respectively, are inserted into vane cavity 112, as shown in FIGS. 3A and 3B, first baffle bodies 108 are slid into respective forward and aft directions, indicated schematically in FIGS. 4A and 4B with arrows. Each first baffle body 108 is laterally slidable through respective opening 126, then through respective longitudinal slot 130 of slotted vane rib 116 and into an expanded position, with respect to its respective second baffle body 110. Flanges 124 of each of first baffle bodies 108 anchor each first baffle body 108 to its respective second baffle body 110 in the expanded position.

With continued reference to FIG. 4B, in an expanded position, one of first baffle bodies 108 is defined in a leading edge portion 118 of cavity 112 and the other of first baffle bodies 108 is defined in a trailing edge portion 120 of cavity 112. A portion of each first baffle body 108 is defined between a respective longitudinal slot 130 of a respective slotted vane rib 116. The second baffle bodies 110 are defined in a middle portion 122 of cavity 112. After the first baffle bodies 108 are slid into the expanded position, baffle bodies 108 are joined to respective slotted vane ribs 116, schematically shown by weld joint 132. Similarly, second baffle bodies 110 are joined to respective opposing sides of the non-slotted vane rib 114, schematically shown by weld joints 134. While weld joints 132 and 134 are shown and described as being at specific locations, those skilled in the art will readily appreciate that there are a variety of suitable positions for a weld joint, for example first baffle body 108 could be joined directly to second baffle body 110. Further it will be appreciated that baffle bodies 108 and 110 can be joined by a variety of methods, such as spot and/or tack welding, and/or other suitable joining methods.

With reference now to FIG. 5, first baffle bodies 208 are similar to first baffle bodies 108, however, they are not nested within second baffle bodies, e.g. second baffle bodies 110. Instead, first baffle bodies 208 are inserted into a vane opening 209 proximate to a vane tip 206, e.g. on the outer diameter platform 211. First baffle bodies 208 are inserted into a middle portion 222 of cavity 212. Second baffle bodies 210 have a closed cross-section instead of having an opening facing a lateral direction, e.g. opening 126.

Now with reference to FIGS. 6A-6B, vane body 202 includes a vane rib 214 and two slotted vane ribs 216, similar to vane rib 114 and slotted vane ribs 116 described above. First baffle bodies 208 are also similar to first baffle bodies 108 in that first baffle bodies 208 each include a pair of opposing flanges 224. Flanges 224 of first baffle bodies 208, however, are configured to anchor each first baffle body 208 to longitudinal slot 230 of slotted vane rib 216, instead of a second baffle body, e.g. second baffle body 110, as will be described below.

As shown in FIGS. 7A and 7B, once first baffle bodies 208 are inserted into vane cavity 212, as shown in FIGS. 6A and 6B, first baffle bodies 208 are slid into respective forward and aft directions, indicated schematically in FIGS. 7A and 7B with arrows. Each first baffle body 208 is slid through a respective longitudinal slot 230 of a respective slotted vane rib 216 and into their respective leading and trailing edge portions 218 and 220, respectively, of cavity 212. Flanges 224 anchor each first baffle body 208 to a respective longitudinal slot 230 of a respective slotted vane rib 216.

With continued reference to FIG. 7B, once slid in place, first baffle bodies 208 are similarly positioned to first baffle bodies 108, described above. After the first baffle bodies 208 are slid into position, each first baffle body 208 is joined to a respective slotted vane rib 216, schematically shown by weld joints 232, similar to weld joints 132, described above.

Figure 8:
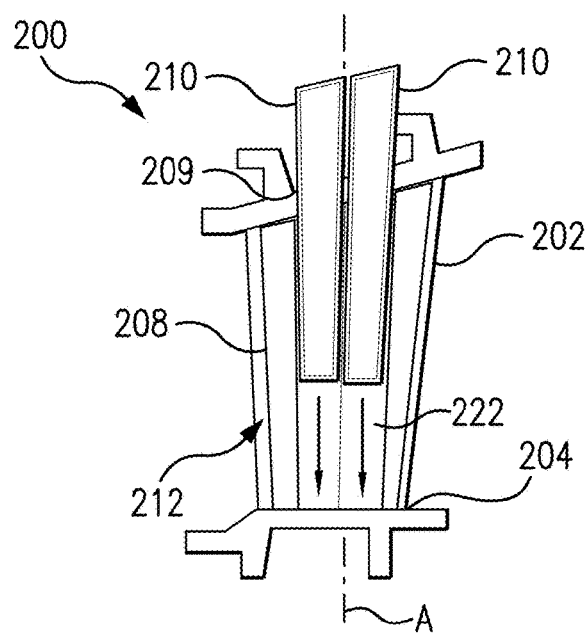
FIG. 8 is a schematic cross-sectional side elevation view of the vane of FIG. 5, showing the second baffle bodies being inserted into the vane after the first baffle bodies have been slid into place.
Figure 9A:
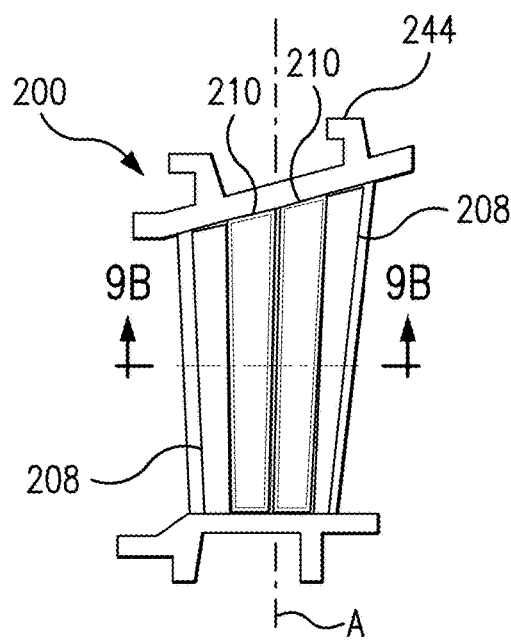
FIG. 9A is a schematic cross-sectional side elevation view of the vane of FIG. 5, showing the second baffle bodies inserted in the vane.
Figure 9B:
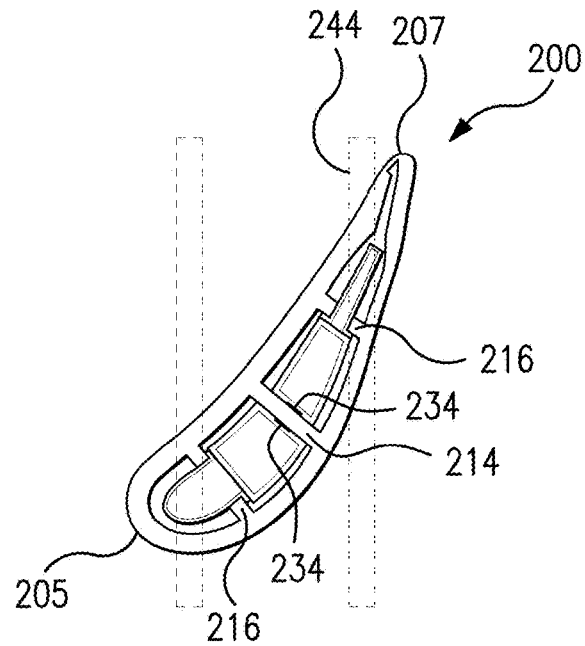
FIG. 9B is a schematic cross-sectional top plan view of the vane of FIG. 5, showing the second baffle bodies inserted in the vane.

Now with reference to FIGS. 8-9B, second baffle bodies 210 are inserted into middle portions 222 of cavity 212 through vane opening 209 after first baffle bodies 208 are in position. As shown in FIGS. 9A and 9B, second baffle bodies 210 are positioned similarly to second baffle bodies 110. Similar to second baffle bodies 110, second baffle bodies 210 are also joined to respective opposing sides of the non-slotted vane rib 214, schematically shown by weld joints 234.

Figure 10A:
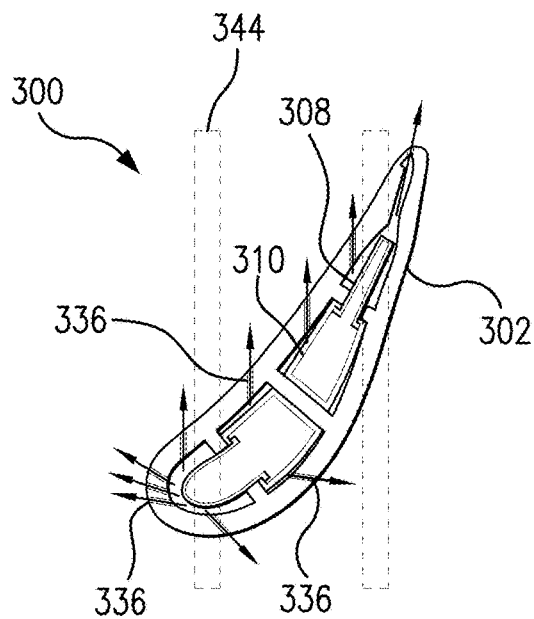
FIG. 10A is a schematic cross-sectional top plan view of another exemplary embodiment of a vane having sliding baffle inserts constructed in accordance with the present disclosure, schematically showing cooling airflow enter the vane and exit through filmholes.
Figure 10B:
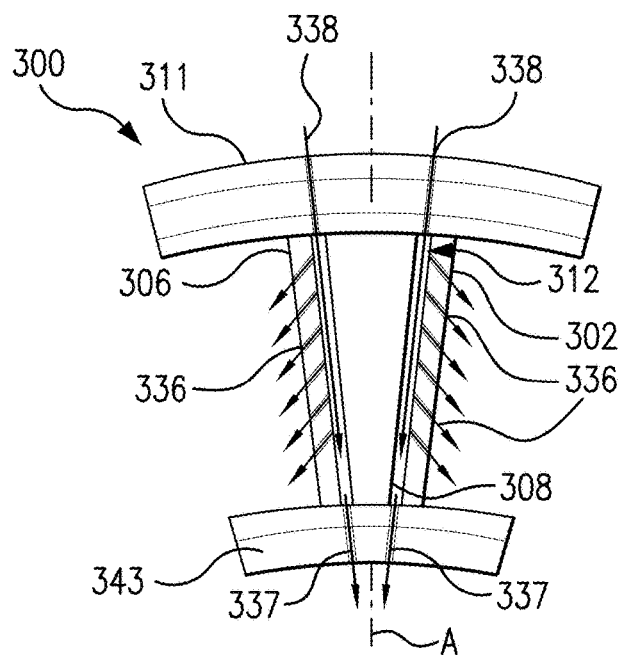
FIG. 10B is a schematic cross-sectional side elevation view of the vane of FIG. 10A, schematically showing the cooling airflow flow between the baffle bodies and the vane.

As shown in FIGS. 10A and 10B, another embodiment of a vane 300 with nested first and second baffle bodies, 308 and 310, in an expanded position, is shown. Vane 300 is substantially similar to vane 100 except that a vane body 302 of vane 300 includes a plurality of filmholes 336 for supplying cooling air to outside of vane body 302. As best shown in FIG. 10B, cooling air is introduced through a plurality of openings 338 on an outer diameter platform 311 proximate to a tip 306 of vane body 302. The air flows through vane cavity 312 between vane body 302 and first and second baffle bodies, 308 and 310, respectively, and out through filmholes 336 or out through an exit 337 proximate to an inner diameter platform 343. This cooling airflow is indicated schematically by the arrows in FIGS. 10A-10B.

Figure 11A:
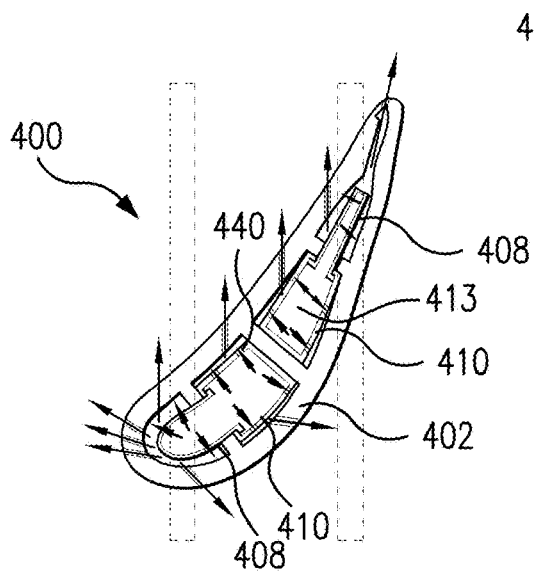
FIG. 11A is a schematic cross-sectional top plan view of another exemplary embodiment of a vane having sliding baffle inserts constructed in accordance with the present disclosure, schematically showing cooling airflow entering first and second baffle bodies.
Figure 11B:
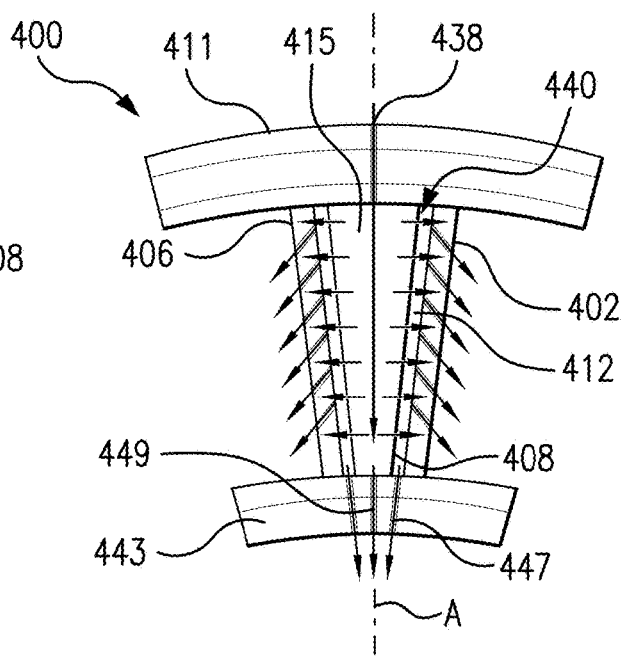
FIG. 11B is a schematic cross-sectional side elevation view of the vane of FIG. 11A, schematically showing the cooling airflow flow exit the baffle bodies through impingement holes, flow between the baffle bodies and the vane, and exit through filmholes in the vane.

As shown in FIGS. 11A and 11B, another embodiment of a vane 400 with nested first and second baffle bodies, 408 and 410, in an expanded position, is shown. Vane 400 is substantially similar to vane 300, except that first and second baffle bodies 408 and 410 include impingement holes 440. As best shown in FIG. 11B, cooling air is introduced through a plurality of openings 438 on an outer diameter platform 411 proximate to a tip 406 of vane body 402.

With continued reference to FIGS. 11A and 11B, the openings 438 guide airflow into hollow interiors 415 and 413 of first and second baffle bodies 408 and 410, respectively. The air flows through each of first and second baffle bodies 408 and 410, respectively, and out through impingement holes 440 to airfoil cavity 412 or out through an exit 449 proximate to an inner diameter platform 443. From the impingement holes 440, the air flow is guided through cavity 412 and out of filmholes 436 or out through additional exits 447, also located proximate to inner diameter platform 443. This cooling airflow is indicated schematically by the arrows in FIGS. 11A-11B.

Those skilled in the art will readily appreciate that embodiments of sliding baffle inserts, e.g. baffle bodies 108, 208, 308 and 408, described in the present disclosure allow baffle inserts to be in cavities that do not have line of sight access for insertion, e.g. leading edge and trailing edge portions. By sliding baffle inserts into areas generally not accessible, cavity area is reduced, which increases Mach numbers and heat transfer coefficients.

The methods and systems of the present disclosure, as described above and shown in the drawings, provide for vanes with superior properties including improved heat transfer coefficients and higher Mach numbers, resulting in more efficient cooling. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A baffle insert for an airfoil, comprising:
a first baffle body extending from a first end to a second end along a longitudinal axis,
wherein:
the baffle insert is configured for being inserted in a longitudinal direction, along the longitudinal axis, into a cavity defined within the airfoil, and being slid in a lateral direction between a longitudinal slot defined by a slotted vane rib within the cavity, wherein the slotted vane rib extends in a transverse direction between pressure and suction sides of the airfoil, and wherein the longitudinal slot is transversely intermediate the pressure and suction sides of the airfoil, and
the first baffle body includes a pair of opposing flanges that extend away from each other in the transverse direction.

2. The baffle insert as recited in claim 1, further comprising a second baffle body having a hollow interior for receiving the first baffle body.

3. The baffle insert as recited in claim 2, wherein:
the hollow interior includes a longitudinally extending opening facing the lateral direction for sliding the first baffle body in the lateral direction between a nested position and an expanded position with respect to the second baffle body, and
in the expanded position, the pair of opposing flanges of the first baffle body respectively engage first and second portions of the second baffle body that extend toward each other in the transverse direction.

4. The baffle insert as recited in claim 3, wherein the flanges of the first baffle body anchor the first baffle body to the second baffle body in the expanded position.

5. The baffle insert as recited in claim 2, wherein at least one of first and second baffle bodies include a plurality of impingement holes for supplying cooling air to a cavity of an airfoil.

6. A vane comprising:
a vane body extending from a root to an opposed tip along a longitudinal axis, wherein the vane body defines a leading edge and a trailing edge, and a cavity defined between the leading edge, the trailing edge, the root and the tip,
wherein the vane body includes a slotted vane rib defined between the leading edge and the trailing edge inside the cavity, wherein the slotted vane rib extends in a transverse direction between pressure and suction sides of the airfoil, and wherein the slotted vane defines a longitudinal slot that is transversely intermediate the pressure and suction sides of the airfoil;
a first baffle body defined in one of a leading edge portion and a trailing edge portion of the cavity, wherein the first baffle body extends from a first end to a second end along the longitudinal axis and includes a pair of opposing flanges that extend away from each other in the transverse direction; and
a second baffle body defined in a middle portion of the cavity such that the first and second baffle bodies are adjacent each other in a lateral direction.

7. The vane as recited in claim 6, wherein a portion of the first baffle body is defined between the longitudinal slot of the slotted vane rib.

8. The vane as recited in claim 7, wherein the pair of flanges of the first baffle body anchor the first baffle body within the longitudinal slot of the slotted vane rib.

9. The vane as recited in claim 7, further comprising a weld joint between the first baffle body and the slotted vane rib.

10. The vane as recited in claim 6, wherein the second baffle body includes a hollow interior for receiving the first baffle body.

11. The vane as recited in claim 6, wherein:
the hollow interior includes a longitudinal opening facing the lateral direction for sliding the first baffle body in the lateral direction between a nested position and an expanded position, and
in the expanded position, the pair of opposing flanges of the first baffle body respectively engage first and second portions of the second baffle body that extend toward each other in the transverse direction.

12. The vane as recited in claim 11, wherein the flanges of the first baffle body anchor the first baffle body to the opening of the second baffle body in the expanded position.

13. The vane as recited in claim 6, wherein the vane body includes a plurality of film holes for supplying cooling air to outside of the vane body.

14. The vane as recited in claim 6, wherein at least one of first and second baffle bodies include a plurality of impingement holes for supplying cooling air to the cavity.

* * * * *